March 25, 1969    J. S. PRATT    3,434,214
MEASURING DEVICE FOR SAFETY DISTANCES BETWEEN MOVING VEHICLES
Filed Oct. 20, 1965    Sheet _1_ of 6
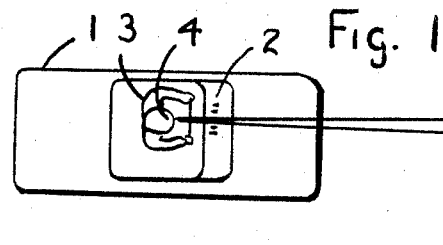
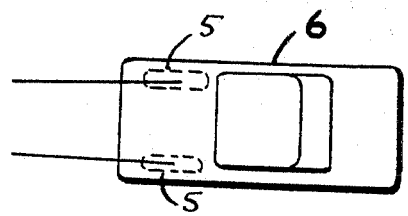
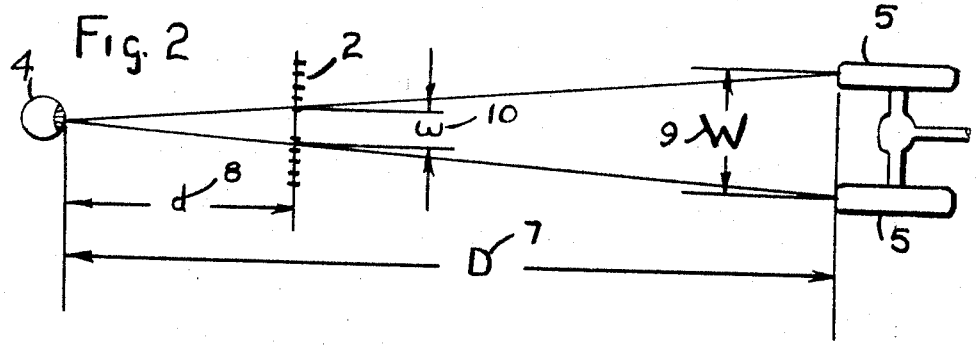
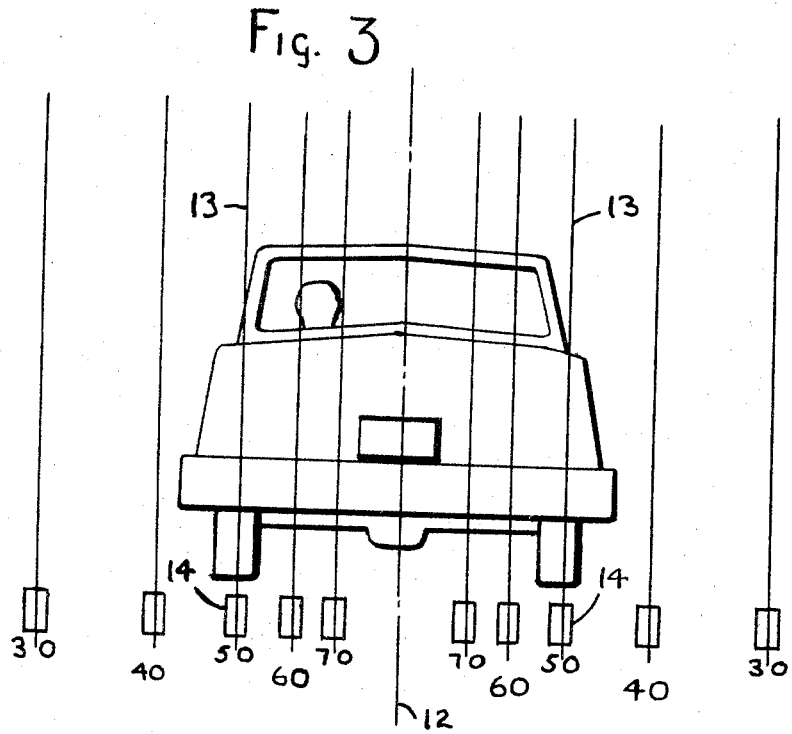
INVENTOR.
James S. Pratt

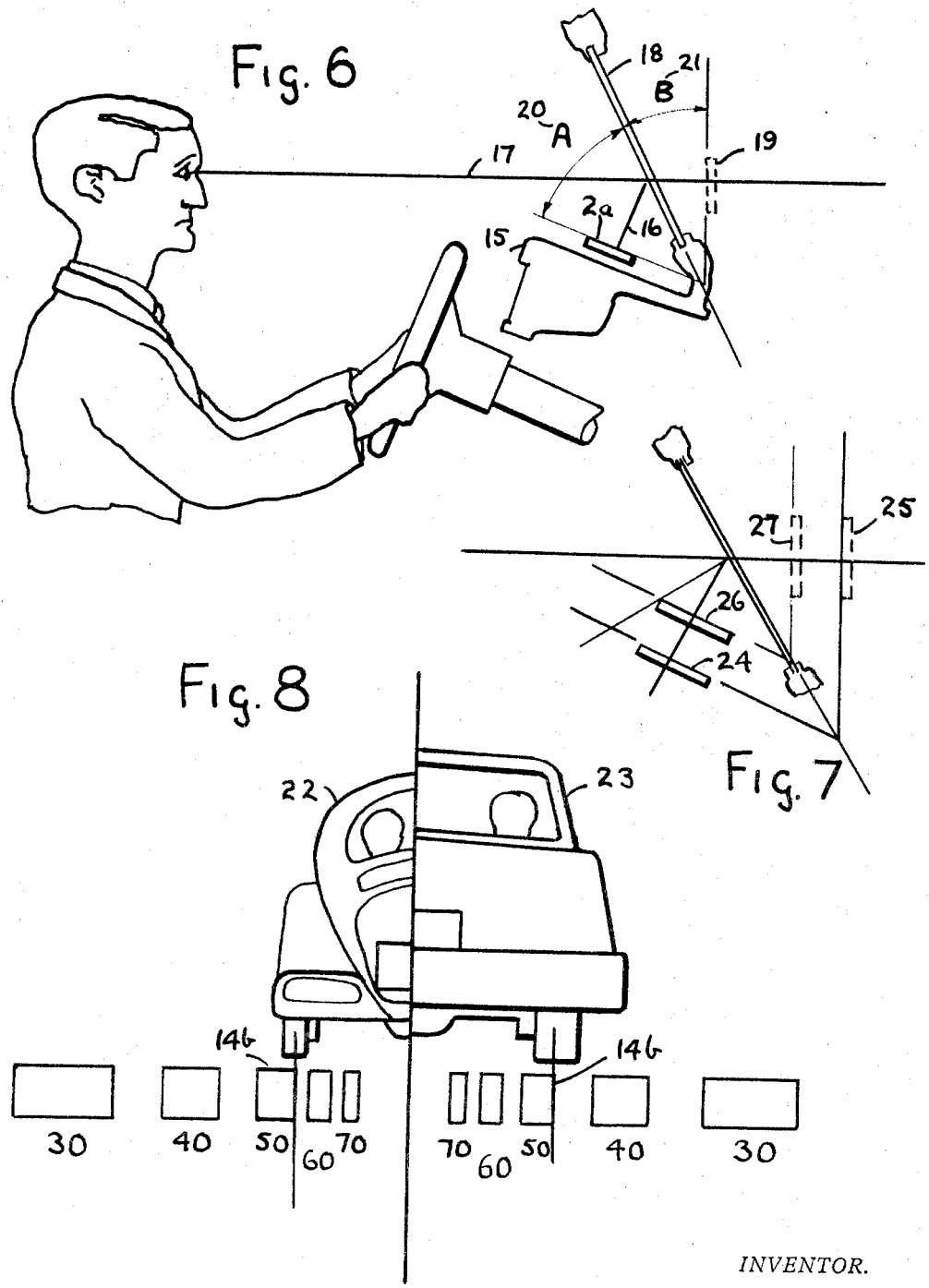

INVENTOR.
James S. Pratt

*INVENTOR.*
James S. Pratt

United States Patent Office 3,434,214
Patented Mar. 25, 1969

3,434,214
MEASURING DEVICE FOR SAFETY DISTANCES BETWEEN MOVING VEHICLES
James S. Pratt, 24 91st St., Brooklyn, N.Y. 11209
Filed Oct. 20, 1965, Ser. No. 498,963
Int. Cl. G01c 3/26
U.S. Cl. 33—64    5 Claims

ABSTRACT OF THE DISCLOSURE

A measuring device for vehicles for determining the safe distance to follow a preceding vehicle is obtained by mounting a support on the vehicle in front of the operator. The support contains indicia spaced apart at predetermined distances and positioned for the operator of the vehicle to view the relationship between the indicia and portions of the preceding vehicle. By adjusting the distance of the vehicle from the preceding vehicle until the preceding vehicle is aligned with portions of the indicia, a safe distance for following the preceding vehicle is obtained.

---

This invention is a device by which a car driver can tell readily if he is travelling too close for safety to the car ahead for the speed at which he is travelling.

One of the commonest types of automobile collisions is the rear-end crash, that is when the car behind hits the car ahead, the latter having slowed down or stopped unexpectedly. Little has been done to reduce the frequency of these accidents other than brake lights to alert the following driver and admonitions by the authorities to stay at least a certain number of car-lengths behind at certain speeds. These recommended distances, which increase greatly with the speed, will be known hereafter as the safety distances. Nothing is yet available to tell the following driver how far he is behind the car ahead other than certain small poles at the side of some roads, which are difficult to use as memory and calculations are required mentally of the driver. Every driver is left to guess at his safety distance and, if his estimate is wrong, even the alert driver will plow into the rear of the leading car despite the brakelights, if the latter makes an unexpected stop.

There are several devices intended to give this information to the driver but they are either too expensive for general installation, such as radar and other electronic devices, or rely on the driver making adjustments and readings as in optical range-finding devices. Additionally, some of these devices rely on extra units especially fitted on the rear of the car ahead, so that if the leading car is not so equipped, then the device is worthless.

Another form of advising the driver of his safety is one such as described in Patent 2,158,310 in which the stopping distance is indicated on the road ahead. This device would be habitually ignored on modern express roads where cars frequently travel with safety at high speeds separated by distances much less than the stopping distances, the safety distance being less than the stopping distance because of the distance travelled by the leading car in coming to a stop, and so become ineffective.

It is the purpose of this invention to give the driver a device whereby at a glance he can tell whether he is too close for safety to the car ahead. A secondary result of this invention is that the driver is kept more alert by virtue of the fact that, every time another car pulls into his lane ahead of him or he himself changes lane, he will check his own speed and the safety distance, and take appropriate action. In this way, he will have cause to be more certain of his speed and so prevent the gradual climb to very high speed unconsciously done by many drivers under today's monotonous conditions, which itself contributes to many rear-end collisions. Another benefit from this device is its ability to help the novice driver in sighting or aiming down the road so that he steers more correctly and so gains confidence more quickly.

In the drawings, which illustrate the principles of the invention and some practical embodiments thereof:

FIG. 1 is a plan view of a car equipped with the invention with the driver of this car sighting through the device on to the wheels of a preceding car. FIG. 2 is a simplified view of the essential features of FIG. 1, namely one eye of the driver, the grid of the invention mounted on the car, and the rear wheels of the preceding car, acting as spaced elements.

FIG. 3 shows the grid of the invention as seen thru one eye by the driver when sighting on the preceding car.

FIGS. 6 and 7 show the invention so located that its reflection in the windshield is used as the sighting device.

FIG. 8 is a composite view of a small and large car as sighted beyond the grid, illustrating how the features of the invention allow for the difference in the wheel span of such cars.

Figure 9:
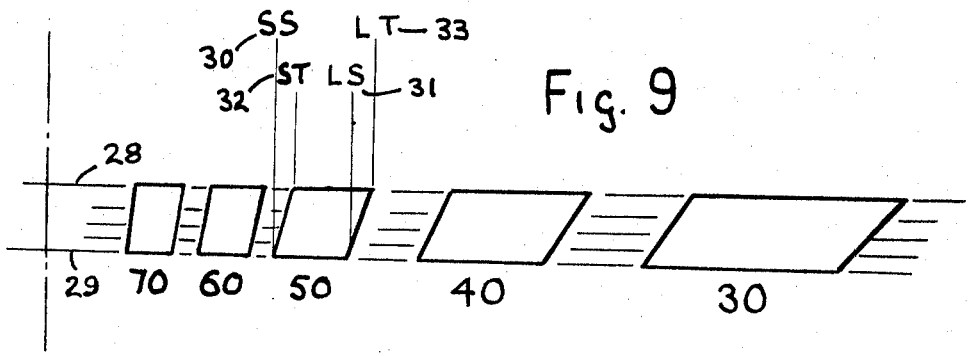
Figure 10:
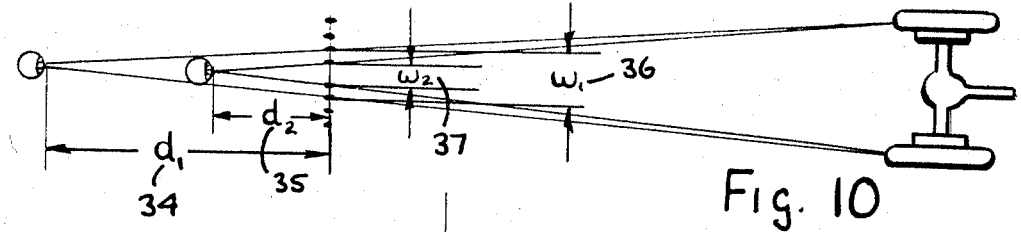

FIGS. 9 and 10 indicate the design of the invention which permits its use by various drivers of the one car sitting at different distances from the unit.

Figure 11:
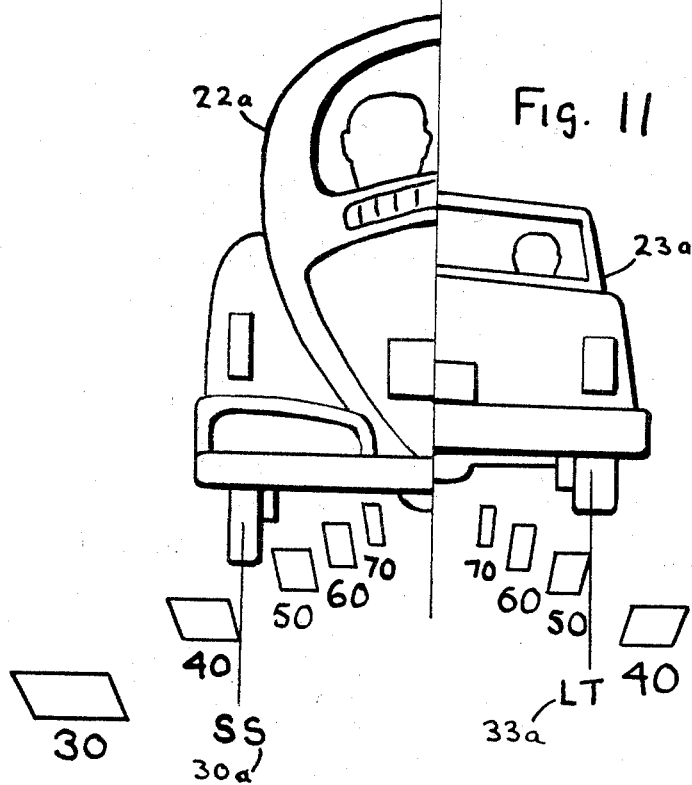

FIG. 11 shows a modification of the device permitting easier sighting of the car ahead, for low speeds when the preceding car is close, and for high speeds when it is remote.

Figure 12:
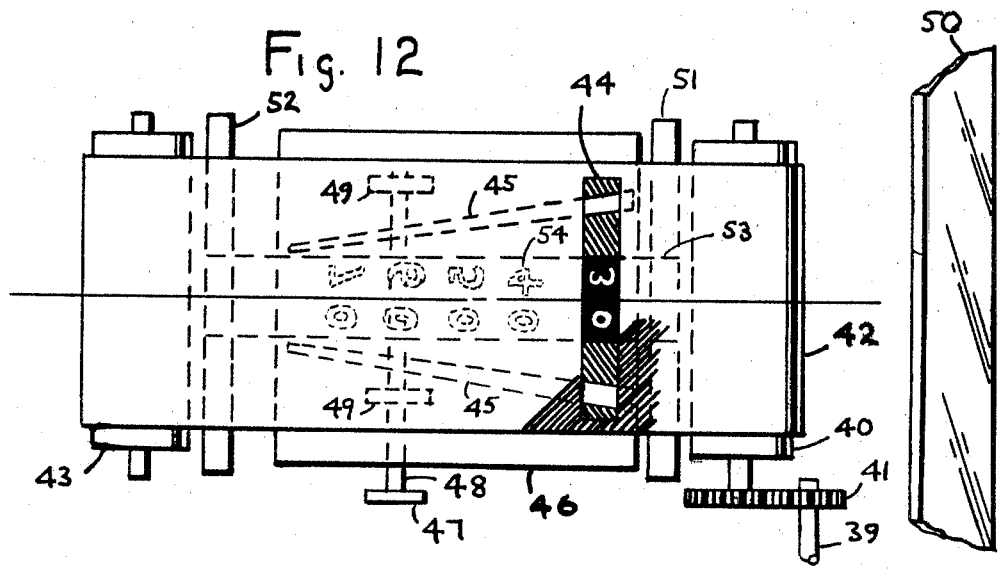
Figure 13:
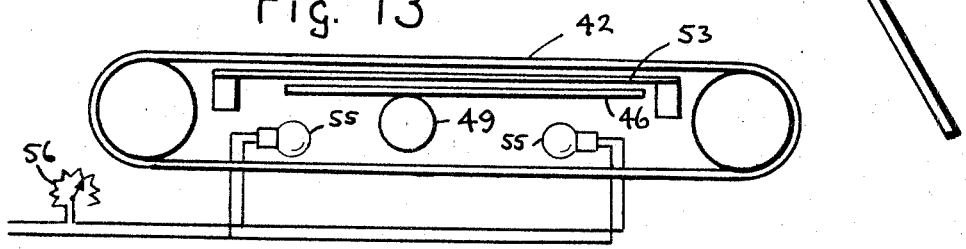

FIGS. 12 and 13 show a mechanical unit which automatically indicates the appropriate spacing distance as the car speed varies.

Figure 14:
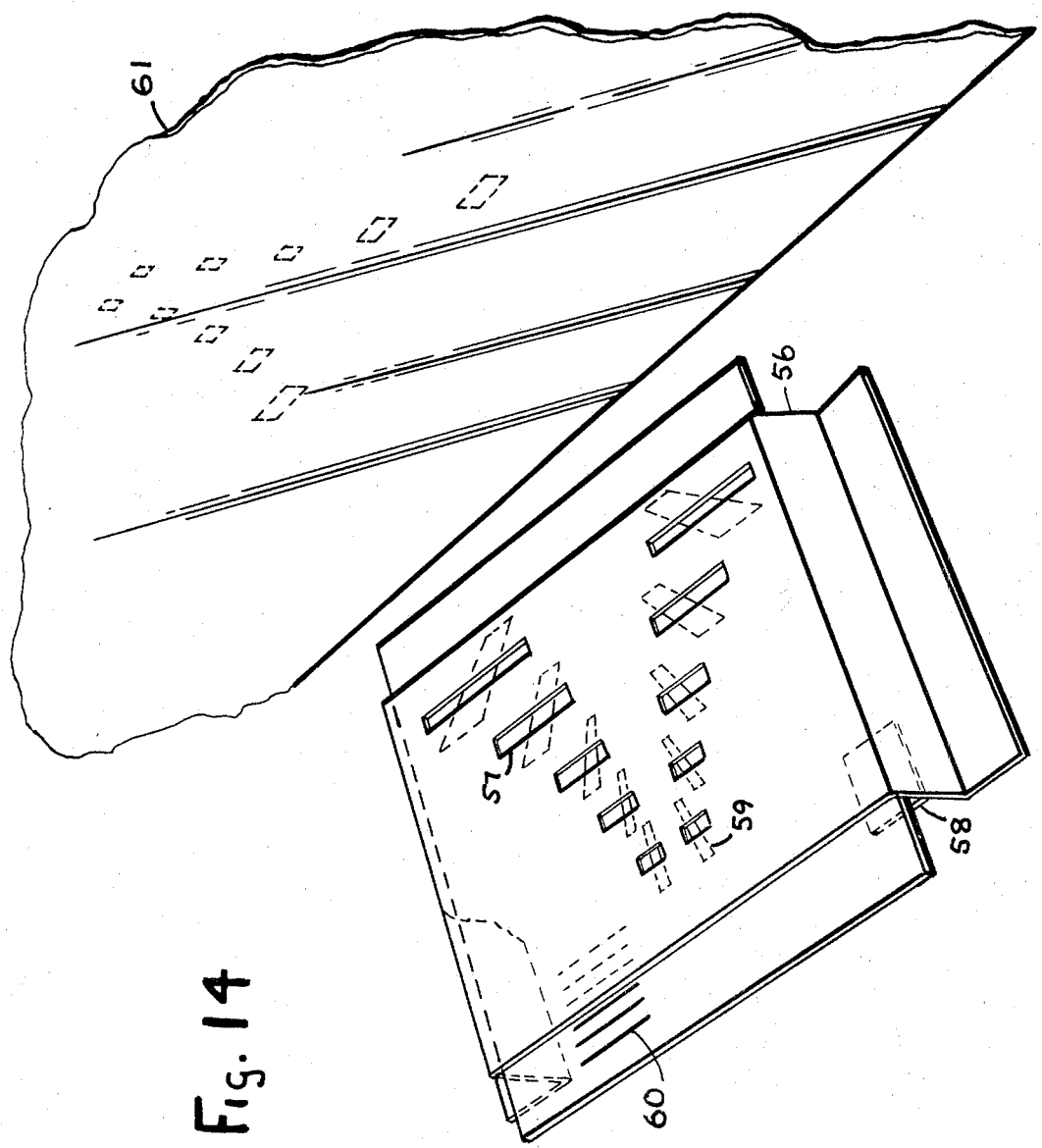

FIG. 14 shows a simple adjustable unit of wide range of viewing distance, so that the one unit could be used in all cars from very small to very large without modifications.

FIGS. 1 and 2 illustrate the application of the invention. The car 1 is equipped with the device 2 mounted on or near the windshield. The driver 3 is sighting with one eye 4 thru the grid of the device 2 on to the rear wheels 5 of the preceding vehicle 6. Simple trigonometry based on the distances between the driver 3 and the rear wheels 5 of the preceding vehicle 6, shown as D7, the distance $d8$ between the driver's eye 4 and the grid 2, and the distance apart W9 of the rear wheels of the preceding vehicle, give the various spacings of the grid, typified by $w10$, as the distance D7 changes. The grid spacings $w10$, are chosen for the spaces D7 between the vehicles which are recommended by authorities as the minimum to be maintained for specific speeds. The effects due to variations in $d8$ and W9 because of different driver size and vehicle magnitude will be discussed in later paragraphs.

The grid spacing device 2 may be placed on the windshield surface, or in between its laminations, directly or slightly below the normal line of vision of the driver, when looking straight ahead, or it may be located between the driver and the windshield or beyond it, out on the hood of the car as shown at 11 in FIGS. 4 and 5. It is small in size, and the unit mounted on or close to the windshield would be made of transparent material such as clear plastic with appropriate markings thereon, so that it would not obscure the driver's view of the road ahead and so constitute a hazard itself.

The device is used as follows, usually when a car ahead of the driver has pulled into the same lane as the driver with no consideration of the safety distance between the two cars. The driver of the car, driving defensibly, must now check his safety distance and make corrections by dropping back, if necessary. He does so first by checking his speed which usually has crept up a little since he last read it, and then by sighting his spacer against the wheel span of the car ahead, closing one eye to do so. Reference to FIG. 3 gives details of the spacer in its elementary form as seen by the driver, with the preceding car centered on the grid.

Equally spaced on either side of a center line 12 are vertical lines, as typified by 13 for 50 m.p.h., which correspond to the apparent tread or width apart of the rear wheels of the preceding vehicle 6 when it is at the safety distances for specific speeds as recommended by authorities on road safety. These vertical lines may be truncated as shown at 14. Should the preceding car's wheel span appear to be greater than that of the spacer lines for the appropriate speed, then the driver of the car should drop back until the span is the same or less than the lines on the spacer.

It may appear that this is a cumbersome and tedious way of checking the safety distance, but on the contrary it will be found in practice to be very simple and calling for little effort. In fact, it is welcomed as a pleasant diversion from the tedium of modern driving. Its simplicity of use can be judged from the fact that by a slight movement of the head to the side or up and down, it can be used adequately on slight curves and hills.

The lines on the spacer are set for a range of speeds. A typical example would be from 30 m.p.h. to 70 m.p.h. in intervals of 10 m.p.h. Color could be used to clarify the markings, with 50 m.p.h. blue, 60 m.p.h. violet, 70 m.p.h. red, and going down in speed, 40 m.p.h. green, and 30 m.p.h. yellow. The speeds may be given at each line in numerals if desired.

Figure 4:
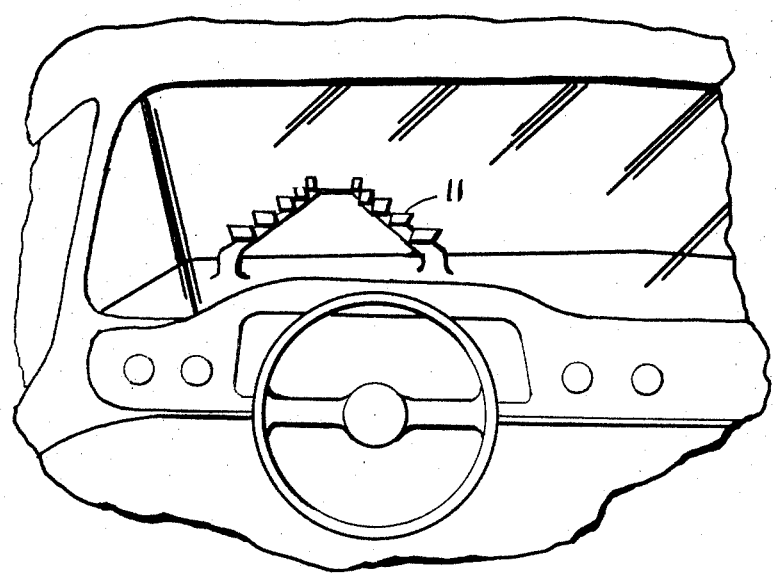
FIGS. 4 and 5 show a variation of the invention mounted on the hood of the car, beyond the windshield.
Figure 5:
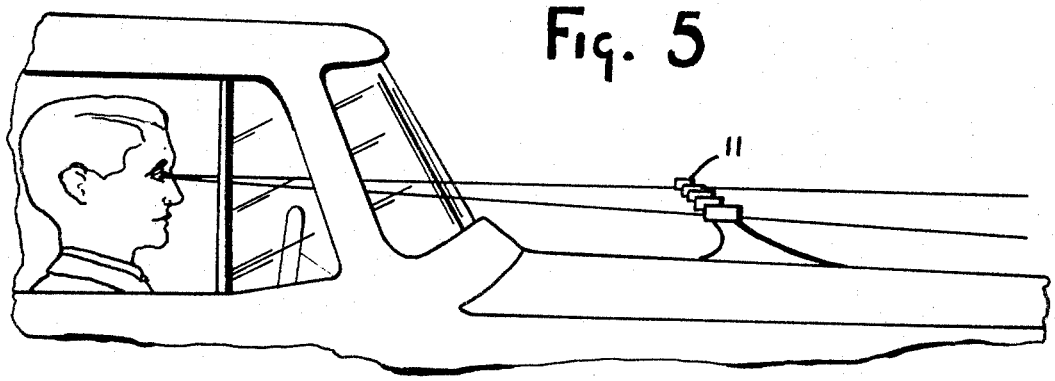

The units shown in FIGS. 1, 2, 3, 4 and 5 are of the fixed line variety, the lines of the grid being marked on the glass of the windshield, or on plastic material, or as in FIGS. 4 and 5 of rigid weatherproof material such as steel, aluminum, zinc, or plastic. Such a unit 11 lends itself well to the effective styling of the car, being functional as well as decorative. Because the majority of drivers sit a little to the left of the steering wheel, the unit 11 is shown off-set from the wheel a corresponding amount. It is possible to have a mechanism which varies the distance between two spacers according to the speed and recommended safety-distances so that all the driver has to do is compare his spacer with the wheel tread of the card in front, without first checking his speed. Such a device, illustrated in FIGS. 12 and 13 will be described in a subsequent paragraph.

It is also feasible to use the reflection of the spacer in the windshield as indicated in FIG. 6, where the spacer 2a is mounted on the canopy 15 over the instrument panel, and the incident ray 16 and the reflected ray 17 on the windshield 18 cause the driver to see the reflection of the spacer 2a apparently at 19 a little beyond the windshield where it can be used in the normal manner. Advantage can be taken of the angle of inclination of the windshield 18 to make the reflected image appear to be in a vertical plane. This is accomplished by making angle A20 between the windshield and the spacer grid 2a equal to the angle B21 between the windshield and the vertical. In the daytime, the reflection is readily seen for all road conditions, if bright colors are used for the spacer grids painted over a dark, dull background; at night, the spacer grid must be illuminated just sufficiently to be discernable in the windshield against the background of the roadway ahead, brilliantly lit up by the car's headlights. The steady, faint reflection the image presents does not constitute a safety hazard, as the driver can see thru it very readily and is not aware of it except when he looks for it.

The wheel span or tread of the wheels of the preceding vehicle has been chosen as the spaced element for comparison purposes because it is by far the easiest element on the car ahead to use under all daylight conditions. All cars have such wheels and even with the occasional car in which a large flap hides most of the wheels it is still possible to sight the wheels from a slightly remote position, or the flap itself can be used if necessary as the spaced element. It is realized that this wheel span varies in dimension for different makes of cars. However, this variance is not very great, ranging from about 48" for a small car to about 64" for a big car. Moreover, all car drivers know the difference in size of cars ahead of them, even if they do not know the make. That is, they will know immediately if the car ahead of them is a small car, a medium car, or a large car or truck, even if they do not know the difference between say a Volkswagen and a Volvo, or between a Ford and a Chevrolet. It is advisable although not essential to make allowance for the difference in span of the wheels of these cars. This is accomplished as indicated in FIG. 8 which is a composite view of a small car 22 on the left and a large car 23 on the right, both cars being at the correct minimum safety distance for 50 m.p.h. The truncated grid line 14b has been widened so that the inside edge of the mark can be used for small cars 22, and the outside edge for large cars 23, or even for trucks by sighting on the inner tire of double wheels—medium sized cars are sighted in the middle of the mark. This is quite an easy thing to do in practice.

Another factor is that different drivers of the same car vary in the distance they sit from the steering wheel and so from the windshield or wherever the spacer is mounted. Accommodation can be made for this variation by mounting the unit on slides and moving it so it, or its reflection, is at the correct distance from the driver's eyes. FIG. 7 indicates how this is accomplished when the reflection in the windshield is being used. The unit is located at 24 and its reflection is at 25 for short-legged drivers, and at 26 and 27 for long-legged drivers. When the unit is fixed in location and spacing, correction is made by angling the truncated spacer lines so that the tops of the marks are used by a tall driver and the bottoms by a short driver. This is illustrated in FIG. 9 where the spacer marks along the horizontal line 28 would be used by long-legged drivers sitting say 30" from the spacer, and the marks along line 29 used by a shorter driver sitting say 25" from the spacer, with other drivers working in between. FIG. 10 illustrates why the marks have to be closer together for a person sitting closer to the spacer grid. As $d_1 34$ is shortened to $d_2 35$, so $W_1 36$ is reduced to $w_2 37$.

Corrections for both the variations in wheel-span and sitting position of the driver are also illustrated in FIG. 9. A short driver sighting on a small car would use SS30, and on a large car LS31; a tall driver would sight on ST32 for a small car and LT33 for a large car. Note that each driver has only one level to work on, peculiar to himself, and does not have to choose between different levels. With these two corrections made, the safety distance can be readily checked with a degree of accuracy quite acceptable for road conditions.

With the shorter safety distances, that is when cars are travelling at lower speeds and closer together, the tires of the preceding vehicle usually appear much lower down in the normal range of vision than do those of more remote cars. Thus the truncated lines on the spacer grid for the lower speeds could appear lower down on the grid than the lines for the higher speed. This is done by displacing the lower speed lines downwards as indicated in FIG. 11 which is a composite view showing a small car 22a on the left and a large car 23a on the right. The small car 22a is at the minimum safety distance for forty miles per hour as seen by a short driver as indicated by SS30a, and the large car 23a at the minimum safety distance for 50 m.p.h. as seen by a tall driver, as indicated by LT33a. If the spacer grid is mounted on a sloping windshield, then as the low speed marks are lowered in the line of sight they also become further away from the driver's eye and compensation must be made. That is in FIG. 2 as $d8$ increases, $w10$ must be correspondingly increased.

FIGS. 12 and 13 show the essential prats of a mechanism for throwing a reflection of the correct space marks on to the windshield 50 for the speed at which the first vehicle is travelling so that the driver thereof is not required to check his speed first. A drive 39 from a standard speedometer turns a cylindrical drum 40 through a gear system 41. Over the drum 40 is a taut flat belt 42 drawn over a second idling drum 43. In this belt is a transverse slot 44 which exposes spacer marks in the form of converging lines 45 which also narrow in width on a reference chart 46 below the belt. The narrowing width of each band and their convergence is such that, on the part of the chart exposed at a given speed, the outer edge corresponds to the apparent wheel tread of large preceding cars and the inner edge to that of small preceding cars, when the preceding car is at the correct minimum safety distance for that speed. This chart 46 is manually adjustable in the longitudinal direction between the drums by means of a thumb wheel 47 and shaft 48 turning friction wheels 49 against the underside of the chart. This manual adjustment permits correction of the unit for drivers sitting at different distances from the windshield 50. The chart is run forward, that is towards the windshield towards the stop 51 for short drivers and away from the windshield towards the stop 52 for tall drivers, with adjustment in between for other drivers. An optional addition but very useful one is a narrow, fixed secondary chart 53 mounted on the stops 51 and 52 and between the chart 46 and the belt 42 on which are printed numerals 54 in mirror reverse which indicate the speed at which the vehicle is travelling as the slot 44 moves over the secondary chart and exposes the appropriate speed, to be reflected by the windshield into normal lettering. The unit is mounted with the divergent ends of the marks 45 towards the windshield and the drive is such that at low speeds the slot 44 in the belt is at the divergent end and moves away from the windshield to the narrow end as the speed increases. The whole unit, with the exception of the divergent marks 44 and 45 and the reversed numerals 54, is painted a dull, dark color to minimize reflection, the marks 44 and 45 and the numerals 54 are a bright color, so that all that is usually seen in the windshield reflection are the exposed sections of the spacer marks and the numeral to indicate the speed. An adjustable means of lighting in the form of bulbs 55 and a rheostat 56 is used for night and dark driving conditions. The driver will now be able to see two spacer marks as a reflection in the windshield which will be narrow in width and close together for high speeds, and in the center of his normal range of vision. As his speed falls, the marks will each widen in width, move away from each other, and drop lower in his range of vision just as do the rear wheels of the preceding car, if the correct safety distance is maintained. If the speed chart is provided, he will also be able to see his speed without diverting his eyes from the driving range of vision. When slippery road conditions prevail, the driver can adjust the chart 46 towards the windshield so narrowing the width between the marks and so indicating a greater safety distance between his car and the preceding car.

FIG. 14 shows a device which allows the driver to adjust the unit to suit his driving position. An outer frame 56 is secured to the top of the instrument canopy or other fixture so that its reflection in the windshield 61 as seen by the driver will appear in his normal viewing area. In the top of the frame are cut transverse slots 57 corresponding to the different levels of the grid as indicated in FIG. 11. Resting in slides 58 below this cover is a chart carrying a tapered spacing mark 59 for each slot, in which each tapered mark is designed to accommodate eye distances from the windshield ranging from close to remote. By adjusting this chart towards or from the windshield, so that the appropriate part of the mark is seen through each of the slots, the driver can set this unit for his own peculiar needs. In the winter-time, with slippery road conditions, he can set the chart so the markings are closer together than for his usual setting, in this way providing a setting asking for a greater safety distance than under non-skid conditions. The settings 60 are marked at the side of the chart for ready reference. The tapers of the marks are such that a linear adjustment of about 1½" covers a variation of distance between the driver's eye and the reflection in the windshield of from say 20"–35", so that one unit is suitable for installation in cars of all magnitudes and drivers of all sizes, and especially for small cars where a linear adjustment of the unit as a whole of 5" or so is not practicable. The markings of the chart are especially light colored for certain speeds and are illuminated by adjustable lighting for night driving, the rest of the unit being colored dark and dull to minimize reflection. The driver, with the correct setting, will see in his windshield an abbreviated grid of spacings properly spaced for his size, with the high speed spacing marks in the center of his normal range of vision and the marks for lower speeds progressively lower down in his normal range of vision.

At night, the driver makes use of the rear lights of the car ahead of him. In general, these lights are somewhat further apart than the wheels of the vehicle as they are intended to indicate the full width of the vehicle. This means that, when the driver of the first car drops back to bring down the spacing of the lights on the preceding car to the indicated width on his spacer, he will be giving himself a little added distance on to his safety distance, an advisable precaution at all times but especially at night.

With the advent of slippery roads in the winter-time or for other reasons, the driver can readily increase his safety distance by mentally adding twenty miles per hour or so to his indicated speed so that, for example, if he is only going 20 m.p.h. under slippery conditions, he will check his safety distance as if he were doing 40 m.p.h. This gives him the much greater safety distance needed under such conditions. With the mechanical device illustrated in FIGS. 12 and 13, it would be necessary to adjust the chart 46 towards the windshield, in addition to any adjustment for short drivers.

These devices are not limited to use by the driver. They can also be mounted for use by the passenger who can thus, with more justification than heretofore, act as a co-pilot and tell the driver when he is too close to the car ahead.

The foregoing invention is based on comparing with the spacer marks the width of the tires of the car ahead, and at night the rear lights, but it is conceivable that the law or prudence might dictate that some easily discernible features be installed on all cars and trucks, set at a regulation width apart, so that the safety distance can be readily discerned without concern for the size of the preceding car. This feature could be a pair of flaps hanging down obscuring or partly obscuring the tires so that the inside edge or the outside edge of the flaps would be the distinctive feature. Conversely, two rods or flags sticking up above the car roof could be employed. A pair of lights always illuminated and of a distinctive color should be used. Many such features could be devised.

Also, some drivers may prefer to sight the center line of the spacer on the center of the preceding car and then use just one half of the spacer grid for comparison with only one of the features of the car ahead. This can easily be done by removing or ignoring the other half of the spacer grid. Other drivers may prefer to compare the apparent area or bulk of the car ahead with an appropriate shape shown on his windshield or elsewhere.

The invention has been described as comparing the width of the tires as spaced elements on the preceding car with those of spaced markings of a grid, using one eye to do so. It is quite possible with practice to do this keeping both eyes open, in the manner of a trained microscope worker using one eye to look down his instrument and keeping the other eye open.

The wording of the description has been generally for cars on a road but it could equally be used for ships, planes and other vehicles including spacecraft when rendezvousing should their electronic devices fail for some reason. For example, airplanes coming in to land on a carrier in close succession maintain certain speeds and distances apart, the latter being estimated from previous experience and ground instruction. The spacer would advise the following pilot more accurately without need for heavy and intricate radar equipment.

In conclusion, the invention has been extended to cover variations in car size and driver size, with only a few speed positions indicated in the fixed grid type of unit, so that it may appear to be a complicated unit to use. In practice and with experience gained in using the device, it is likely that the driver as he squirms around in his seat on a long drive, changing distance of his eyes from the device from close as he leans forward to far as he pushes back, will keep the wheels of the preceding car well within the inside of the appropriate marks irrespective of car size and driver position. He will probably also use the marks for the next speed above his actual speed so that he does not have to interpolate for his speed. This means that using the device in this, the simplest manner, insures he will be well above the safety distance, a major improvement over today's undirected driving habits.

I claim:
1. Means for readily measuring the distance between a first vehicle and a preceding vehicle which comprises a housing having a longitudinal axis and a transverse axis, a chart mounted in said housing having a pair of spacer marks diverging from the longitudinal axis of the housing, said chart being located beneath a layer of opaque material moveably mounted on said housing and having a transparent slot extending transversely across the housing, the slot exposing only a portion of the spacer marks, the opaque material being adapted to be moved along the longitudinal axis of the housing relative to the speed of the vehicle, the housing being so positioned within the vehicle as to reflect on a suitable surface in the field of vision of the operator an image of the spacer marks through the transparent slot.

2. A measuring means in accordance with claim 1 embodying means for manually moving said chart for adjusting the width of said marks and the spacing of said marks about the central axis relative to said slot for accommodating the various distances of different drivers' eyes from said marks, and changing for the individual driver the predetermined standards of speed related to the distance between the vehicles according to the road surface conditions of sliding friction.

3. The invention as claimed in claim 1 wherein the chart is manually adjustable along the longitudinal axis of the housing.

4. The invention as defined in claim 1 wherein said two spacer marks are equally spaced on said longitudinal axis and being of a predetermined width and spaced apart so that spaced elements on a large preceding vehicle will when viewed through the outer edge of the marks indicate the distance to said preceding vehicle and whether the distance is safe in accordance with said standard, and that spaced elements on a small preceding vehicle will when viewed through the inner edges of such marks indicate the distance to said preceding small vehicle and whether the distance is safe in accordance with said standard, such marks moving away from the central axis and each other and lower down in the normal range of vision as the speed of the said first vehicle decreases.

5. In a first vehicle a means for readily measuring the intervening distance between the first vehicle and the preceding vehicle with reference to a predetermined standard of speed related to such distance, comprising a device mounted on said first vehicle below the normal range of vision between the driver thereof and said second vehicle, the reflection of components of the device in the windshield seen by the driver thereof appearing in the normal range of vision, such device comprising an extended drive from the speedometer of the first vehicle, rotating one of two cylindrical rolls on which is drawn a flat belt tuatened to move the first roll and turn the second, in said flat belt a transverse slot opening across the belt exposing portions of a reference chart underneath comprised of converging marks spaced on either side of the center of the belt, said reference marks for each standard of speed having such a width that spaced elements on a large preceding vehicle will when viewed through the outer edge of the reflection in the windshield indicate the distance to said preceding large vehicle and whether the distance is safe in accordance with said standard, and that spaced elements on a small preceding vehicle will when viewed through the inner edge of the reflection in the windshield indicate the distance to said preceding small vehicle and whether the distance is safe in accordance with said standard, said reference chart being manually adjustable in longitudinal position between the rolls to permit setting the chart to accommodate the different distances between the sighting eye of various drivers and the reflected image of the device in the windshield, said device being darkly colored except the converging marks which are brightly colored, clear material, said marks being illuminated when required by internal lights of adjustable intensity, the device located with the low-speed slot position near the bottom of the windshield, and the high-speed slot position away from the bottom of the windshield, and so angled to the windshield that the reflected image in the windshield appears in approximate vertical plane to the driver.

References Cited

UNITED STATES PATENTS 2,960,772  11/1960  Robins.

FOREIGN PATENTS 1,065,626  9/1959  Germany.
2,056,650  10/1923  Great Britain.
72,284  5/1916  Switzerland.

HARRY N. HAROIAN, *Primary Examiner.*